(12) United States Patent
Courier De Mere

(10) Patent No.: US 6,185,117 B1
(45) Date of Patent: Feb. 6, 2001

(54) SELF-COMPENSATING CONVERTER

(75) Inventor: Henri Courier De Mere, Mettray (FR)

(73) Assignee: H.B. Industries, Tours (FR)

( * ) Notice: Under 35 U.S.C. 154(b), the term of this patent shall be extended for 0 days.

(21) Appl. No.: 09/463,617

(22) PCT Filed: Jul. 23, 1998

(86) PCT No.: PCT/FR98/01637

§ 371 Date: Mar. 22, 2000

§ 102(e) Date: Mar. 22, 2000

(87) PCT Pub. No.: WO99/05775

PCT Pub. Date: Feb. 4, 1999

(30) Foreign Application Priority Data

Jul. 28, 1997 (FR) .................................................. 97 09580

(51) Int. Cl.[7] .................................................. H02M 7/00
(52) U.S. Cl. .................................................. 363/125; 363/37
(58) Field of Search .................................................. 363/125, 133, 363/37; 315/200 R, 205, 225

(56) References Cited

U.S. PATENT DOCUMENTS 4,322,789 * 3/1982 Courier De Mere ................ 363/133
5,010,277 * 4/1991 Courier De Mere ................ 315/200 R
5,469,028 * 11/1995 Nilssen ................................ 315/291

FOREIGN PATENT DOCUMENTS 2696291    9/1992  (FR) .

* cited by examiner

Primary Examiner—Peter S. Wong
Assistant Examiner—Rajnikant B. Patel
(74) Attorney, Agent, or Firm—Larson & Taylor, PLC

(57) ABSTRACT

A converter powered by an alternating network drawing therefrom a current with a power factor close to unity and a non-linear distortion factor close to five percent, wherein the amplitude of the current applied to an output load remains substantially constant. A bridge circuit is provided using switches and capacitors wherein the reactance at the quench frequency is selected such that a portion of the converted energy is added between the terminals of an output capacitor to the main current rectified by a bridge. A buffer source has a direct voltage with substantially constant amplitude which enables balancing of the generated voltages, thereby eliminating the risk of destruction by uncontrollable excess voltages.

14 Claims, 3 Drawing Sheets

SELF-COMPENSATING CONVERTER

BACKGROUND OF THE INVENTION

1. Field of the Invention

The present invention relates to electronic converters referred to as "self-compensated" electronic converters which are connected to the AC line voltage and provide at an output a high-frequency signal of substantially constant amplitude, while the AC line current remains substantially sinusoidal and in phase with the voltage because of the energy transfer mode recovery of a suitable portion of the previously converted high-frequency energy.

2. Description of the Related Art

The prior art system of this kind which offers the best performance is shown in the accompanying FIG. 1, which shows the most beneficial embodiment of the system claimed in U.S. Pat. No. 5,134,556. In that embodiment, which is representative of the prior art, the output terminal B of the converter A delivers the high-frequency converted energy via a galvanic isolation capacitor C whose capacitance is chosen so that its impedance at said high frequency does not significantly interfere with the resonant frequency of the output oscillatory circuit, which include's the inductor D, the output load E and the phase-shifter capacitor F. Unlike the capacitor C, the capacitor F must have an impedance at the high switching frequency such that the amplitude of the alternating current signal developed between its terminals reaches a chosen value. That signal, applied to one of the non-polarized input terminals of the rectifier bridge I, enables the envelope of a low-frequency rectified signal to be recovered between the terminals of the capacitor H.

The polarized outputs of the rectifier bridge I are connected in series with the polarized outputs of the AC line voltage rectifier bridge J, with the result that said low-frequency envelope between the terminals of the capacitor H is added to the rectified AC line voltage signal, which improves the power factor of the AC line current.

BRIEF DESCRIPTION OF THE SEVERAL VIEWS OF THE DRAWINGS

Further to FIG. 1 relating to the prior art.

DETAILED DESCRIPTION OF THE INVENTION

By recovering a portion of the high-frequency converted energy in this way, in proportion to the current flowing in the output load E, the power factor of the AC line current can only be compensated in a very approximate manner and there is no real reduction of its harmonic content.

For this reason, it is therefore necessary to use an additional circuit for adding to said signal proportional to the current flowing in the output load E a second rectified signal proportional to the high-frequency voltage between the terminals of the output load E.

That circuit includes the capacitor G whose impedance is chosen in accordance with said high frequency and delivers a voltage signal of suitable amplitude at the non-polarized second input terminal of the rectifier bridge I.

After rectification, a new low-frequency envelope is then available between the terminals of the capacitor H, where it is added to the previously recovered current envelope.

Only the addition of these three envelopes enables a system of this kind to comply with standards concerning the AC line current.

Despite its high energy efficiency and its apparent simplicity, a system of the above kind has a number of drawbacks, as mentioned hereinafter.

1) The necessity to adjust precisely the respective amplitudes of the current and voltage envelopes recovered in this way between the terminals of the capacitor H.

2) The necessity to use an additional protection device which must be capable of absorbing transient overvoltages that could develop between the terminals of the capacitor H, especially when the voltage is applied to the converter A, and whose energy can in some cases lead to immediate destruction of the converter.

The system in accordance with the invention alleviates the above drawbacks and, with very simple means, achieves a power factor of the AC line current which is close to unity, combined with a total harmonic distortion (THD) of that current of around 5%, a value which is currently far from being complied with by the most sophisticated prior art systems.

Figure 2:
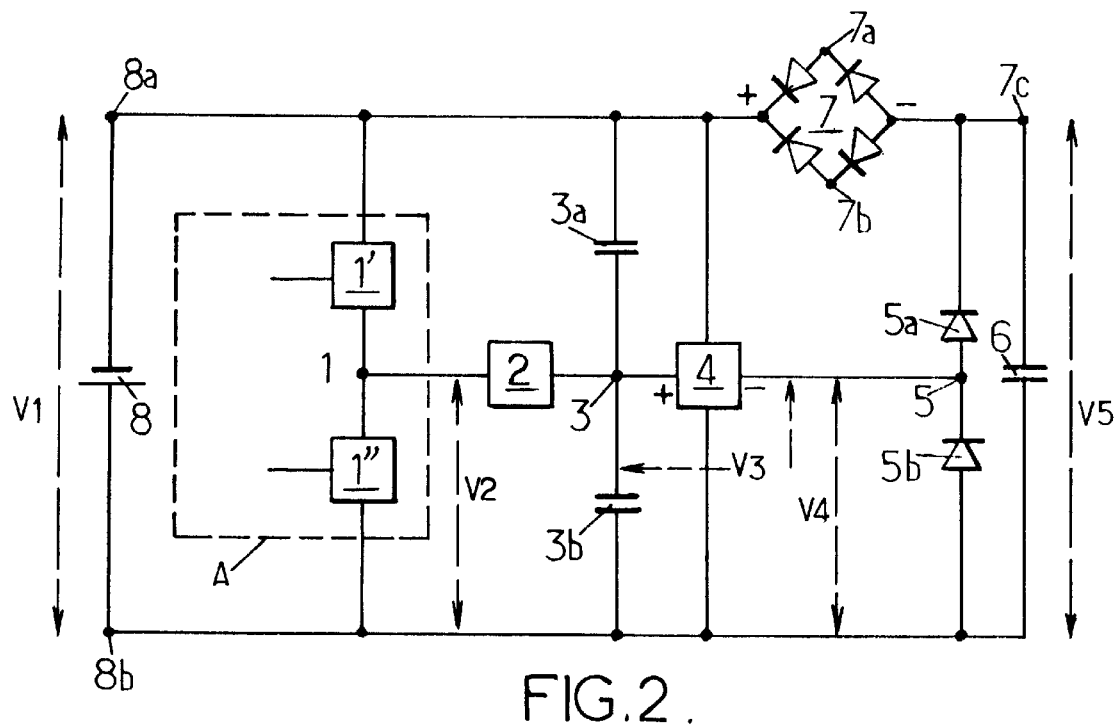
FIG. 2 illustrates a general embodiment of the self-compensating converter of the invention.

The accompanying FIG. 2 shows a general embodiment of the system in accordance with the present invention.

The system includes a high-frequency self-oscillator using a structure referred to as a "capacitor half-bridge" which is fed with direct current from polarized common terminals 8a and 8b shunted by a decoupling capacitor 8.

The active arm of the bridge converter includes switching means 1' and 1" connected in series.

The terminals at the outside ends of the resulting series circuit are connected to terminals 8a and 8b, respectively.

The passive arm of the bridge converter includes the capacitors 3a and 3b, which are also connected in series.

The terminals at the outside ends of the resulting series circuit are connected to the terminals 8a and 8b, respectively.

The output load 2 which is to receive the high-frequency converted energy is connected between the midpoint 1 of said active arm and the midpoint 3 of said passive arm.

Thus, as soon as a DC voltage of sufficient amplitude is applied between the terminals 8a and 8b and a control device, not shown, sustains alternating cyclic conduction of the switching means 1' and 1", a high-frequency switching current can flow through the load 2 in a circuit which is closed by the capacitors 3a and 3b whose reactance at said high frequency is calculated so that the AC voltage developed between the midpoint 3 and either terminal 8a or 8b is a non-zero voltage with a chosen amplitude.

The high-frequency AC voltage developed in this way between the midpoint 3 and one of the polarized common terminals is then fed via the buffer DC voltage source 4 to the non-polarized input terminal 5 of the full-wave rectifier bridge including the diodes 5a and 5b.

This is possible because the impedance of the buffer DC voltage source 4 to the high-frequency alternating current generated in this way is negligible, even though the DC voltage of virtually constant amplitude between terminals 3 and 5 can be of considerable magnitude.

The polarized output circuit of said doubler bridge, which is shunted by the decoupling capacitor 5, after it has been appropriately oriented, is connected in series with the polarized output circuit of the AC line voltage rectifier bridge 7 whose non-polarized input terminals 7a and 7b are connected to the AC line voltage.

As soon as voltage is applied to the terminals 7a and 7b, the rectified AC line current can charge the decoupling capacitor 8 via the suitably polarized diodes 5a and 5b.

As soon as alternate cyclic conduction of the switching means 1' and 1" has been established, a high-frequency alternating current flows through the output load 2.

The predetermined fraction of this current which cannot flow through the capacitors 3a and 3b because of their reactance at said high frequency loads the input terminal 5 of said doubler bridge via the buffer DC voltage source 4.

After this current is rectified, a low-frequency envelope is recovered between the terminals of the decoupling capacitor 6. Its amplitude is proportional to the high-frequency current flowing through the load 2.

This low-frequency envelope is then added to the low-frequency envelope derived from the rectified AC line current between the terminals 7c and 8b.

Although the maximum amplitudes of these two low-frequency envelopes necessarily have a large relative phase difference, those amplitudes nevertheless remain proportional to each other.

This is because the envelope derived from the rectified AC line current is, ignoring losses, proportional to the converted energy absorbed by the output load 2.

Moreover, the amplitude of the high-frequency AC voltage that is applied to the terminal 5 is also proportional to the converted energy.

The amplitude of the low-frequency envelope between the terminals of the capacitor 6, after rectification, therefore also remains proportional to the low-frequency envelope derived from the rectified AC line current.

If the low-frequency envelope corresponding to the rectified high-frequency current recovered in this way has a suitable amplitude, merely adding it to the signal corresponding to the rectified AC line current between the terminals of the capacitor 6 is sufficient to correct virtually all of the effects that the high capacitance of the capacitor 8 might have on the linearity of the AC line current.

The only constraint that must imperatively be complied with to obtain optimum results from this system is restricted to providing a buffer source 4 which has a negligible impedance to said high-frequency alternating current and delivers a DC voltage V3 free of spurious low-frequency modulation.

The value of the voltage V3 is directly related to the value of the DC voltage V2 developed between the midpoint 1 and one of the common terminals 8a or 8b and the value of the DC voltage V4 developed between the terminal 5 and the common terminal 8b.

That value can be approximately calculated using the equation $$V3 \approx (V2 - V4).$$

To make the example more concrete, it is assumed that the decoupling capacitor 8 is charged to a DC voltage V1 of 370 V, for example.

As V1≈2×V2, the voltage V2 is then substantially equal to 370 V÷2, i.e. approximately 185 V.

The DC voltage V5 between the terminals 7c and 8b is therefore approximately 160 V.

As V5≈V4×2, the DC voltage developed between the terminals 5 and 8b is substantially equal to 160 V÷2, i.e. approximately 80 V.

The mean DC voltage V3 to be maintained between the terminals 3 and 5 of the buffer source 4 is therefore 185 V−80 V, ice. approximately 105 V.

By observing this simple rule, it is possible to obtain perfect adaptation of the system in accordance with the invention and, with no additional circuitry, to achieve quasi-perfect correction of the power factor and the harmonic distortion of the AC line current.

Constructed as described above, and without requiring any particular adjustment, this system typically achieves a power factor of 0.995 for the AC line current and a total harmonic distortion of 7%, and the voltage between the common terminals 8a and 8b is subject to only negligible modulation.

The low modulation of the voltage between the common terminals 8a and 8b results in low modulation of the envelope of the high-frequency current flowing through the output load 2 and a very small amplitude of the current flowing through the capacitor 8.

Figure 3:
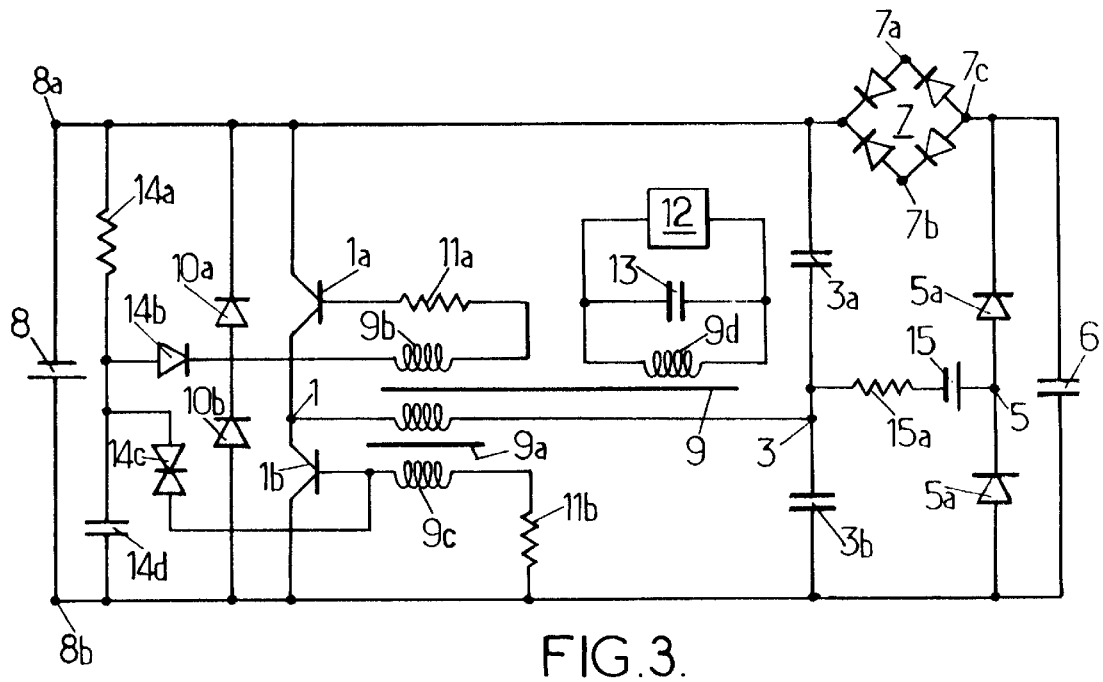
FIG. 3 illustrates a first embodiment of the self-compensating converter of the invention shown in FIG. 2.

The accompanying FIG. 3 shows a practical embodiment of the present invention, which is distinguished from the previous one as indicated hereinafter.

This embodiment of the system in accordance with the invention uses a capacitor half-bridge converter whose active arm includes the series-connected transistors 1a and 1b, or other semiconductors adapted to serve as switching means, and whose passive arm includes the series-connected capacitors 3a and 3b, which have a given reactance to said high-frequency alternating current.

The primary 9a is connected between the midpoints 1 and 3 of these bridge arms and, by virtue of being coupled to the magnetic circuit 9, is substituted for said output load 2.

Alternate cyclic conduction of the transistors 1a and 1b, controlled by the secondaries 9b and 9c which are appropriately oriented and coupled to the magnetic circuit 9.

To assure alternate cyclic conduction therein, said secondaries apply a signal of appropriate amplitude and phase to the control junction of the transistors 1a and 1b, respectively, via limiter resistors 11a and 11b.

The recovery high-frequency AC voltage developed between the terminal 3 and either polarized common terminal 8a or 8b is fed via the appropriately polarized high-value capacitor 15 to the non-polarized input terminal of the doubler rectifier bridge including the appropriately polarized diodes 5a and 5b.

As before, the polarized output terminals 7c and 8b of said rectifier bridge are shunted by the filter capacitor.

The recovered high-frequency current rectified in this way takes the form of a low-frequency envelope which, after it is added to the envelope corresponding to the AC line current rectified by the rectifier bridge 7, as mentioned above, compensates the AC line current from the non-polarized input terminals 7a and 7b.

The appropriately polarized diodes 10a and 10b respectively connected in anti-parallel with the transistors 1a and 1b assure the dual flow of current between the midpoint 1 and either polarized common terminal 8a or 8b.

After voltage is applied to the system, cyclic conduction of the resulting converter is initiated conventionally by the trigger device combining the resistor 14a, the capacitor 14d, the inhibitor diode 14b and the voltage threshold device 14c. The control electrode of the transistor 1b is therefore excited by a suitable signal.

The winding 9d coupled to the magnetic circuit 9 therefore delivers the converted energy to the receiver 12 connected between its terminals, in a mode referred to as "voltage transfer".

The capacitor 13 connected in parallel with the receiver 12 has the following functions.

Firstly, if the magnetic circuit 9 is designed to have the smallest possible air gap, the function of the capacitor 13 is to limit the effects of the leakage inductance affecting the resulting transformer.

Secondly, if the magnetic circuit 9 intentionally has a large air gap, the function of the capacitor 13 is to constitute, with the inductance of the secondary 9d, a parallel resonant circuit whose overvoltage effects can be exploited in the power supply of the receiver 12.

In this arrangement, the rectified AC line voltage between the polarized output terminals 8a and 7c of the rectifier bridge 7 is automatically applied to the high-value capacitor 15 which provides said buffer DC voltage source 4.

This is because the capacitor 15 can be charged via the series circuit including the transistor 1a, the primary 9a, the resistor 15a which limits the initial charging overcurrent and the diode 5a which maintains the voltage between the terminals 3 and 5 at a constant value corresponding to said voltage V3.

The DC voltage between the terminals 3 and 5 is therefore affected by low-frequency ripple whose level depends essentially on the continuous charge that the capacitor 15 can accumulate.

It is therefore advantageous for the capacitor 15 to have the highest possible capacitance.

The capacitor must transmit the rectified AC line voltage envelope without attenuating it.

In ordinary low-power applications, the ripple on the DC voltage V3 between the terminals 3 and 5 remains virtually negligible if the capacitor 15 has a value of several tens of microfarads.

Concomitantly, the impedance of a capacitor of this value to the recovered high-frequency current flowing from the terminal 1 to the terminal 5 also remains negligible.

The high-value capacitor 15 then behaves as a buffer DC voltage source whose quasi-constant amplitude enables adaptation of the various potentials developed within a system of this kind.

The capacitor 15 therefore fulfils perfectly the function of said buffer DC voltage source 4.

Constructed in this way, the system of the invention achieves excellent compensation of the power factor of the AC line current and an extremely low level of harmonics therein.

Moreover, the low-frequency ripple affecting the DC voltage between the common terminals 8a and 8b is maintained at a very low level, which in the final analysis leads to low ripple on the high-frequency current envelope applied to the receiver 12 and a small excursion of the amplitude of the current with low-frequency ripple flowing through the capacitor 8.

Figure 4:
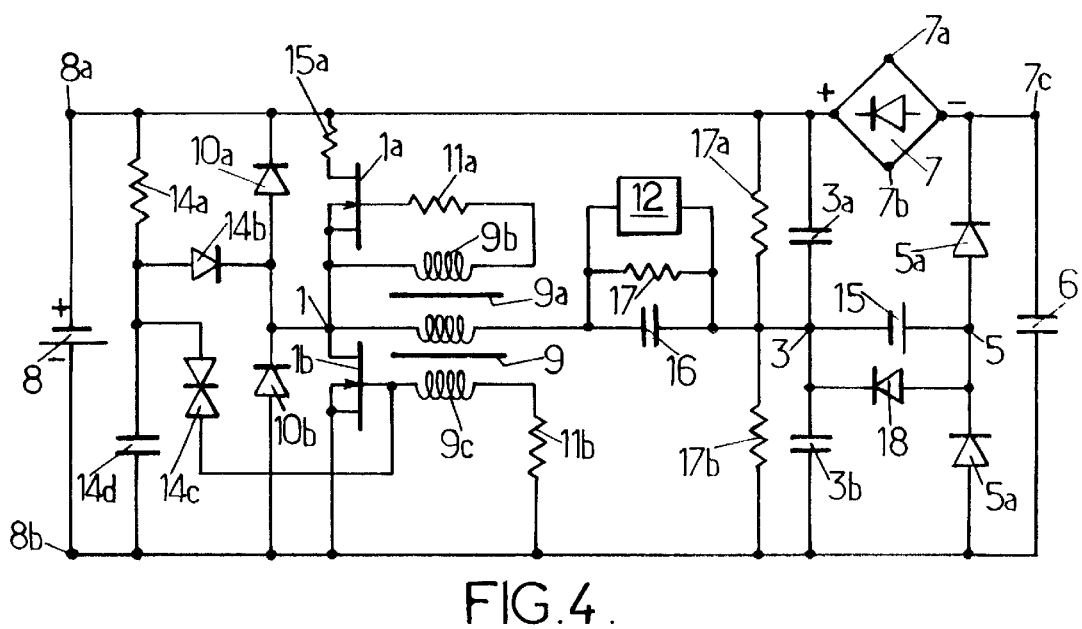
FIG. 4 illustrates a second embodiment of the self-compensating converter of the invention shown in FIG. 2.

The accompanying FIG. 4 shows another embodiment of the system in accordance with the invention.

In accordance with what has been described hereinabove, this embodiment differs from the preceding one as follows:

Firstly, the inductance of the primary 9a constitutes, with the capacitor 16 connected in series with it, a series oscillatory circuit in which resonance occurs at a frequency close to that of alternate cyclic conduction of the transistors 1a and 1b.

In this system, the high-frequency converted energy is extracted in the mode referred to as "energy transfer".

This is because, in this embodiment, the receiver 12 is connected directly between the terminals of the capacitor 16 and is therefore exposed to the high-frequency AC potential developed between its terminals.

Connected in this way, the receiver diverts a suitable portion of the high-frequency current flowing between the terminal 1 and the terminal 3.

The converted energy portion applied in this way to the receiver 12, whose impedance is known, is then limited to a suitable value that is determined by the impedance of the primary 9a and the reactance of the capacitor 16.

Precise adjustment of the amplitude in this way is easily obtained by a judicious choice of the values of these two components.

The function of the resistor 17 shunting the receiver 12 and the capacitor 16 is to pass the direct current required to charge the capacitor 15 if said receiver includes a dielectric barrier.

In this case, the resistor 17 could equally be connected between the terminal 8a and the terminal 3, which would enable continuous charging of the capacitor 15, as before.

This resistor could be replaced by the resistor bridge 17a and 17b which is connected between the common terminals 8a and 8b and whose midpoint is connected to the terminal 3.

The capacitor 15 serving as the buffer DC voltage source 4 could also be charged at a constant voltage to a substantially constant amplitude in this way.

The suitably polarized diode 18 shunting the capacitor 15 is optional and its function is to improve the transmission of the high-frequency alternating current flowing between the terminals 3 and 5.

Because of this diode, the capacitor 15 carries only one half-wave of said high-frequency recovered current.

Figure 5:
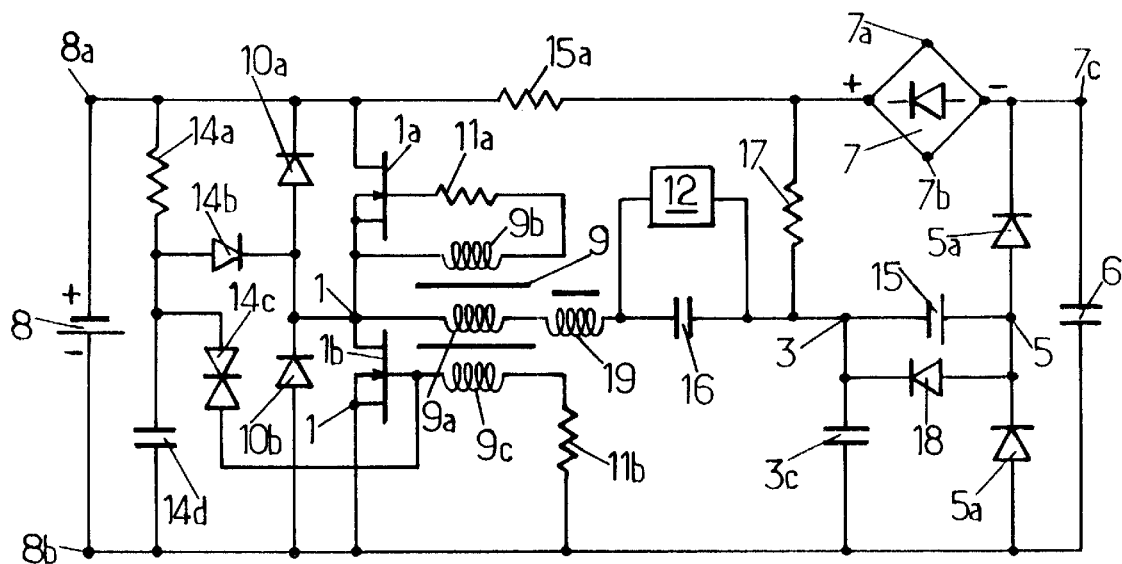
FIG. 5 illustrates a third embodiment of the self-compensating converter of the invention shown in FIG. 2.

The accompanying FIG. 5 shows another embodiment of the system in accordance with the invention.

This embodiment differs from the previous ones in that an additional inductor 19 is connected in series with the capacitor 16 to form a series oscillatory circuit therewith.

In this case, the impedance of the primary 9a makes no significant contribution to the resonant frequency of said oscillatory circuit since, associated with the secondaries 9b and 9c, this primary has no function other than to constitute an independent transformer which controls alternate cyclic conduction of the transistors 1a and 1b.

In this embodiment the capacitors 3a and 3b are replaced by a single capacitor 3c whose capacitance is twice that of each of those two capacitors.

The reactance of the single capacitor at said high frequency therefore remains substantially the same as the resultant of the other two capacitances, which achieves similar performance while saving one component.

Here, as indicated above, the resistor 17 enables charging of the voltage reservoir capacitor 15 from the terminals 8a and 7c by circumventing possible galvanic isolation or non-linear characteristics of the output receiver 12.

The resistor 15a for limiting the inrush current when voltage is applied to the AC line voltage input terminals 7a and 7b to charge the voltage reservoir capacitor 15 is connected in series with the transistors 1a and 1b constituting said active bridge arm.

Figure 6:
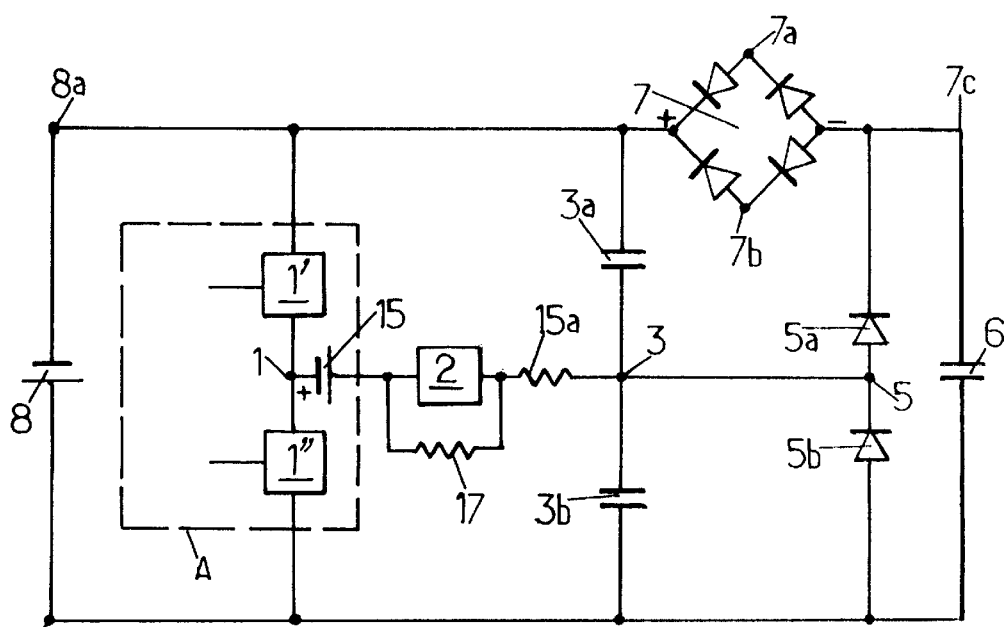
FIG. 6 illustrates a final embodiment of the self-compensating converter of the invention shown in FIG. 2.

The accompanying FIG. 6 shows a final embodiment of the system in accordance with the invention.

This embodiment differs from the embodiment shown in the accompanying FIG. 2 in that the voltage reservoir capacitor 15 serving as the buffer DC voltage source 4 is no longer connected between the terminals 3 and 5, but instead between the terminals 1 and 3, in series with the output load 2.

In this case, the terminal 3 and the terminal 5 are connected together.

The low-value resistor 15a connected in series with the capacitor 15 limits the inrush current when voltage is applied.

Before said converter is started up and the switching means 1" begin to conduct, the high-value resistor 17c connected between the terminal 8a and the terminal 1 pre-charges the capacitor 15 to a DC voltage and compensates the self-discharge due to the leakage current that is inevitable with any capacitor.

As previously described, the high-value resistor 17 closes the direct current charging circuit to the voltage reservoir capacitor 15 if the output load 2 has isolation or galvanic discontinuity characteristics corresponding to a negative or non-linear resistance, for example.

In this embodiment, as in the preceding ones, for a converted power from 10 W to 50 W the crucial components could have the following values, for example:

| | |
|---|---|
| 8 | 10 µF/350 V electrolytic capacitor |
| 15 | 47 µF/100 V electrolytic capacitor |
| 15a | 10 ohms/0.25 W resistor |
| 17/17c | 470 kilohms/0.25 W resistor |

The rectified AC line voltage available between the polarized output terminals 8a and 7c of the rectifier bridge 7 therefore charges the capacitor 15 to a stable DC voltage with practically no residual ripple at 100 Hz or 120 Hz, because the discharge current of the high-capacitor connected in this way is negligible.

Because the high-value storage capacitor 15 has only a very low impedance at the low frequency of the rectified AC line voltage, the high-frequency converted alternating current which flows through it is practically free of any modulation at 100 Hz or 120 Hz.

Figure 1:
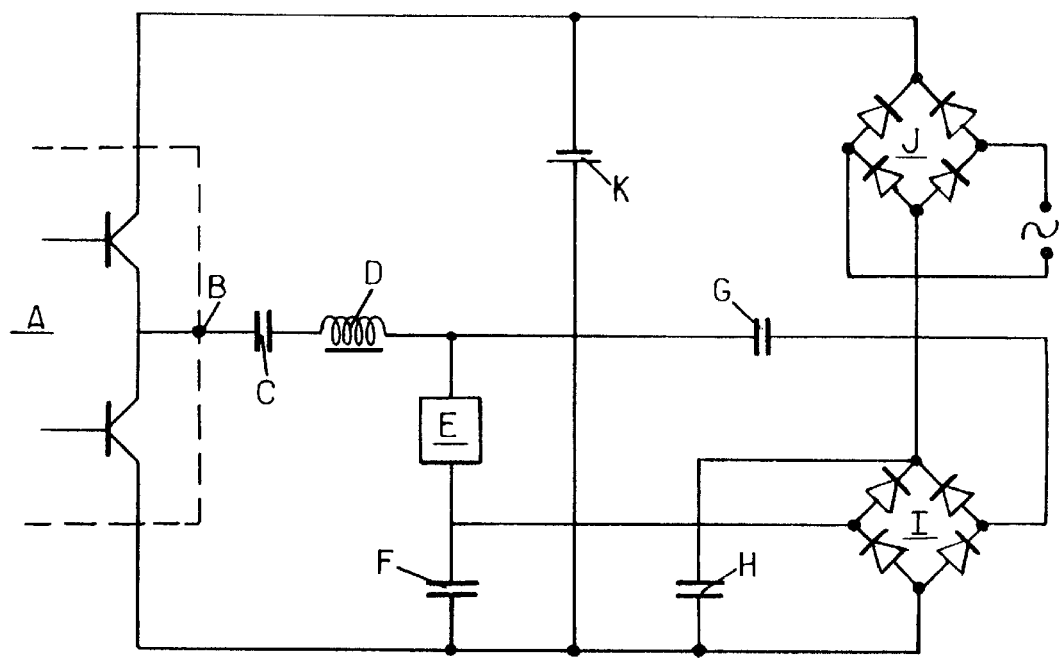

This feature essentially distinguishes the function of the capacitor 15, used as a non-modulatable buffer DC voltage source, from the function of the capacitor C in the accompanying FIG. 1, which is merely to provide a galvanic barrier, between whose terminals the high-frequency converted current is modulated at 100 Hz or 120 Hz with an amplitude which can be equal to that of the rectified AC line voltage between the output terminals of the diode bridge J.

The system in accordance with the invention as just described assures virtually perfect correction of the power factor and harmonic distortion of the AC line current.

This result is obtained by adding to said rectified AC line current envelope only a low-frequency envelope resulting from rectification of a given portion of the high frequency energy, unlike the approach adopted in prior art systems in which, to achieve a less good result, it is necessary to add two separate low-frequency envelopes obtained by rectifying a current signal and a voltage signal, both of which are derived from the high-frequency converted energy.

What is more, unlike the system shown in the accompanying FIG. 1, the system in accordance with the invention eliminates dangerous overvoltages between the terminals of the capacitors 8 and 6 to which the capacitors H and K are subjected and whose principal cause is highly excessive overmodulation of the converted current at 100 Hz or 120 Hz.

The system in accordance with the invention, which is simple to construct and requires no fastidious adjustments, corrects the drawbacks of prior art systems.

The system of the invention can be used with advantage in all low-cost applications which must comply with standards concerning the AC line current, such as AC line voltage power supplies, electronic transformers, electronic ballasts, compact fluorescent lamps, etc. As emerges from the foregoing description, and as is obvious in any event, the invention is in no way limited to the embodiments that have been specifically described, and to the contrary encompasses all variants thereof.

What is claimed is:

1. System adapted to be connected to an AC line voltage including a bridge converter whose active arm includes switching means and whose passive arm includes capacitors, said converter delivering to an output load a high-frequency alternating current of substantially constant amplitude, whereas the AC line current remains substantially sinusoidal and in phase with the voltage thanks to the recovery in energy transfer mode of a portion of the high-frequency energy developed between the midpoint of said passive arm and polarized common terminals by virtue of the reactance of said passive arm, which enables, after rectification of said energy portion by a full-wave rectifier bridge including diodes, a low-frequency envelope to be obtained between the terminals of a decoupling capacitor which, when added to the rectified AC line current signal present between a polarized output terminal of an AC line voltage rectifier bridge and one of the polarized common terminals, compensates the effect of the low impedance of a decoupling capacitor, reflected in low residual ripple between the polarized common terminals and virtually perfect compensation of the power factor and the harmonic distortion of the AC line current, wherein a substantially constant amplitude buffer DC voltage source forms with the output load a series circuit which is connected between the midpoint of the active arm and a non-polarized input terminal of the full-wave rectifier bridge, said voltage source having negligible impedance to the flow of said high-frequency alternating current.

2. System according to claim 1, wherein the amplitude of the DC voltage developed between the midpoint of the passive arm and the non-polarized input terminal of the full-wave rectifier bridge, which constitute the terminals of the buffer source, is approximately equal to the difference between the amplitude of the voltage developed between the midpoint of the active arm and one of the polarized common terminals and the amplitude of the voltage between the non-polarized input terminal and one of said polarized common terminals, this enabling good adaptation of the various potentials in said system.

3. System according to claim 1 wherein the buffer DC voltage source is a high-value reservoir capacitor which is charged from one of the polarized common terminals and the polarized output terminal of the AC line voltage rectifier bridge.

4. System according to claim 1, wherein a low-value resistor is connected in series with the charging circuit of the reservoir capacitor in order to limit the inrush current thereof when voltage is applied to the system.

5. System according to claim 1, wherein a high-value resistor or a high-value resistor bridge diverts a portion of the potential corresponding to the rectified AC line voltage between the polarized terminals and the terminals of the reservoir capacitor so that the leakage current of that capacitor is permanently compensated and the DC voltage between its terminals remains substantially constant.

6. System according to claim 1, wherein in that the reservoir capacitor or the buffer DC voltage source forms with the output load a series circuit which is connected between the midpoint of the active arm and the midpoint of the passive arm.

7. System according to claim 1, wherein the capacitors constituting said passive bridge arm are reduced to a single capacitor whose capacitance is substantially twice the capacitance of each of them.

8. System according to claim 1, wherein the switching means and are semiconductors of any type adapted to be used for switching.

9. System according to claim 1, the load is constituted by the primary of a transformer whose secondaries control alternate cyclic conduction of the switching means and whose secondary evacuates the high-frequency converted energy to an output receiver in the voltage transfer mode.

10. System according to claim 9, wherein a capacitor connected between the terminals of the secondary constitutes therewith a parallel oscillatory circuit which resonates at said high frequency.

11. System according to claim 1, wherein the inductance of the primary and the capacitance of a capacitor connected in series therewith constitute a series oscillatory circuit resonating at said high frequency and from which the converted energy is taken in the energy transfer mode and supplied to the output receiver connected between the terminals of the capacitor, and the secondaries are coupled to the primary by a magnetic circuit and control the alternate cyclic conduction of the switching means.

12. System according to claim 11, wherein that said magnetic circuit constitutes, with the primary and the secondaries, no more than a transformer adapted to control the alternate cyclic conduction of the switching means and an independent inductor forms with the capacitor said series oscillatory circuit resonating at said high frequency.

13. System according to claim 3, wherein an appropriately polarized diode is connected between the terminals of the reservoir capacitor.

14. System according to claim 3, wherein the storage capacitor is of the electrolytic type.

* * * * *